(12) United States Patent
Moser et al.

(10) Patent No.: US 11,707,815 B2
(45) Date of Patent: Jul. 25, 2023

(54) CREATING 3D MARK ON PROTECTIVE COATING ON METAL PART USING MASK AND METAL PART SO FORMED

(71) Applicant: General Electric Company, Schenectady, NY (US)

(72) Inventors: Roland Richard Moser, Zürich (CH); Sophie Betty Claire Duval, Zürich (CH)

(73) Assignee: General Electric Company, Schenectady, NY (US)

( * ) Notice: Subject to any disclaimer, the term of this patent is extended or adjusted under 35 U.S.C. 154(b) by 895 days.

(21) Appl. No.: 16/505,810

(22) Filed: Jul. 9, 2019

(65) Prior Publication Data

US 2021/0008689 A1    Jan. 14, 2021

(51) Int. Cl.
*B24C 1/04* (2006.01)
*F01D 5/28* (2006.01)
*B24C 5/02* (2006.01)

(52) U.S. Cl.
CPC .............. *B24C 1/04* (2013.01); *B24C 5/02* (2013.01); *F01D 5/288* (2013.01); *F05D 2230/90* (2013.01)

(58) Field of Classification Search
CPC .. B24C 1/04; B24C 1/086; B24C 5/02; B24C 7/0023; F01D 5/288; F05D 2230/14;
(Continued)

(56) References Cited

U.S. PATENT DOCUMENTS

| | | | |
|---|---|---|---|
| 4,327,283 | A | 4/1982 | Heyman et al. |
| 5,427,890 | A | 6/1995 | Suzuki et al. |

(Continued)

FOREIGN PATENT DOCUMENTS

| | | | |
|---|---|---|---|
| CN | 109968206 | A * | 7/2019 |
| EP | 2140973 | A1 | 1/2010 |

(Continued)

OTHER PUBLICATIONS

Guo et al., CN 109968206 A, Machine Translation, generated Oct. 4, 2022. (Year: 2022).*

(Continued)

*Primary Examiner* — Duy Vu N Deo
*Assistant Examiner* — Christopher Remavege
(74) *Attorney, Agent, or Firm* — James Pemrick; Charlotte Wilson; Hoffman Warnick LLC

(57) ABSTRACT

A method for creating a three-dimensional (3D) mark in a protective coating including at least one of a TBC and a bond coating over a metal part, is provided. The method may include positioning a mask over the protective coating, the mask including an opening pattern therein; and performing an abrasive waterjet process on the protective coating using the mask. The abrasive waterjet erodes a first portion of the protective coating exposed through the first opening pattern to create the 3D mark. The mask is removed, leaving the 3D mark in the protective coating. The 3D mark only partially penetrates through the protective coating. A metal part may include a metal body, a protective coating over the metal body, and the 3D mark in the protective coating, is also provided. The 3D mark in the protective coating may include an opening having a width of between 30 and 300 micrometers.

13 Claims, 13 Drawing Sheets

(58) Field of Classification Search
CPC .......... F05D 2230/90; F05D 2260/941; F05D 2270/11; F05D 2270/331; F05D 2270/332; F05D 2270/808; G01M 5/0016; G01M 5/0033
See application file for complete search history.

(56) References Cited

U.S. PATENT DOCUMENTS

| | | | |
|---|---|---|---|
| 5,704,824 A | 1/1998 | Hashish et al. | |
| 6,635,393 B2 * | 10/2003 | Pierrat | G03F 1/30 430/311 |
| 6,887,529 B2 * | 5/2005 | Borneman | C23C 4/18 118/503 |
| 6,905,396 B1 * | 6/2005 | Miller | C23C 4/02 451/75 |
| 7,967,924 B2 * | 6/2011 | Groh | B23P 15/006 29/889.2 |
| 8,622,784 B2 * | 1/2014 | Miller | B24C 1/086 451/29 |
| 9,016,104 B2 | 4/2015 | Moser et al. | |
| 9,358,663 B2 * | 6/2016 | Fulton | B08B 1/04 |
| 10,155,298 B2 * | 12/2018 | Araujo | B64F 5/40 |
| 10,196,920 B2 * | 2/2019 | Subramanian | C23C 4/04 |
| 2002/0141872 A1 * | 10/2002 | Darolia | F01D 5/182 416/241 R |
| 2004/0256504 A1 * | 12/2004 | Segrest | B08B 3/02 241/1 |
| 2008/0206542 A1 * | 8/2008 | Vance | F01D 11/122 428/304.4 |
| 2009/0311416 A1 * | 12/2009 | Nelson | C23C 4/18 427/560 |
| 2010/0003894 A1 * | 1/2010 | Miller | C23C 4/18 451/75 |
| 2012/0101775 A1 * | 4/2012 | Mitchell | F01D 21/003 702/183 |
| 2015/0031272 A1 * | 1/2015 | Fulton | F01D 11/122 451/178 |
| 2015/0107368 A1 * | 4/2015 | Harding | G01M 11/081 73/822 |
| 2015/0118444 A1 | 4/2015 | Lipkin et al. | |
| 2017/0121232 A1 * | 5/2017 | Nelson | C23C 14/22 |
| 2017/0175566 A1 * | 6/2017 | Burnside | G01M 15/14 |
| 2020/0370439 A1 * | 11/2020 | Nelson | B05D 3/12 |

FOREIGN PATENT DOCUMENTS

| | | |
|---|---|---|
| EP | 2243595 A1 | 10/2010 |
| WO | 2016113651 A2 | 7/2016 |

OTHER PUBLICATIONS

PCT Search Report and Written Opinion for corresponding PCT Application No. PCT/US2020/040047 dated Sep. 10, 2020, 17 pages.

* cited by examiner

CREATING 3D MARK ON PROTECTIVE COATING ON METAL PART USING MASK AND METAL PART SO FORMED

BACKGROUND OF THE INVENTION

The disclosure relates generally to marking parts, and more particularly, to a method of creating a three dimensional (3D) mark on a protective coating on a metal part using a mask, and the metal part so formed.

Marks are created on the surface of metal machine parts for a number of reasons. In one application, lasers etch a surface of a metal part to create an identification mark, e.g., an identifying bar code. In another application, wire free creep measurement test structures are permanently formed, e.g., cut or printed, onto or into the metal part's surface so the part can be scanned for creep assessment after use. By identifying changes in the test structure created over time, e.g., by comparison to a baseline twin test structure, creep can be measured. Each test structure may be unique and include its own identifier, e.g., bar code. Repairs or replacement may be identified based on the strain measurements.

The processes of creating the marks suffer from a number of drawbacks. For example, the metal parts are oftentimes protected from harsh operational environments, e.g., heat, corrosive gases, etc., by one or more protective coatings including a ceramic that cover the surface of the metal part. Current methods to create the marks in the surface of the metal part are not applicable to the protective coatings, e.g., ceramic coatings. For example, electronic discharge machining (EDM) may be used to create relatively deep marks in the metal part, e.g., a cut, but cannot be used on protective coatings. Other methods that create marks such as photolithography-based chemical etching, grit blasting and laser ablation, are also inapplicable to protective coatings because the processing cannot be controlled relative to the more brittle ceramic coating leading to penetration of the protective coating and exposing the metal or cracking of the coating and the metal. Both situations render the coating useless or shorten the life of the coating, and eventually shorten the life of the part by initiating cracks in the bond coat and/or base metal. Precision is also very hard to achieve when machining ceramics. Chemical etching has been applied to both metal and ceramic coatings to create marks, but it requires precise control of the chemicals and duration, and cannot be readily applied in a selective fashion. Thus, the process is typically untenable, except perhaps in a highly controlled, factory setting. Indeed, current processes for creating marks are always performed in a factory setting with highly controlled equipment, and are incapable of precise reproduction in an on-site location, e.g., at a power plant for a turbomachine part. Consequently, most current mark creating processes cannot be used on-site for used metal parts having a protective coating including a ceramic thereon.

Where parts do not include a ceramic coating, a ceramic marking may be added, but this process cannot be completed outside of highly controlled, factory setting. Further, the ceramic mark is typically very brittle and not erosion resistant.

BRIEF DESCRIPTION OF THE INVENTION

A first aspect of the disclosure provides a method for creating a three-dimensional (3D) mark in a protective coating over a metal part, the method comprising: positioning a first mask over the protective coating, the first mask including a first opening pattern therein; performing a first abrasive waterjet process on the protective coating using the first mask, the first abrasive waterjet at least eroding a first portion of the protective coating exposed through the first opening pattern to create the 3D mark, the mark penetrating only partially through the protective coating; and removing the first mask, leaving the 3D mark in the protective coating.

A second aspect of the disclosure provides a metal part, comprising: a metal body; a protective coating over at least a portion of the metal body; and a three-dimensional (3D) mark in the protective coating, the 3D mark including an opening having a width between 30-300 micrometers.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
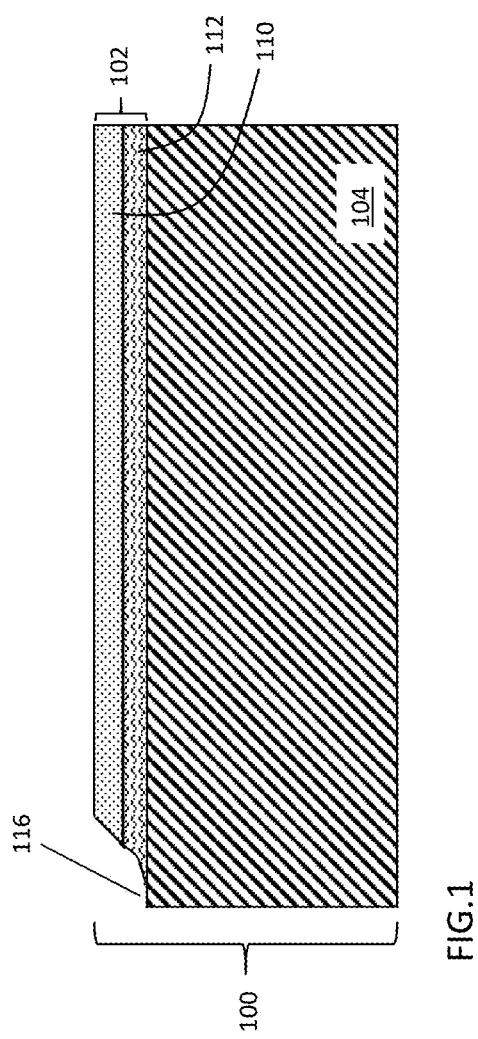
FIG. 1 shows a cross-sectional view of a metal part with a protective coating thereon.

As an initial matter, in order to clearly describe the current disclosure it will become necessary to select certain terminology when referring to and describing relevant machine components within an industrial machine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a metal particular component may be referred to using several different or overlapping terms. What may be described herein as being a single metal part may include and be referenced in another context as consisting of multiple components. Alternatively, what may be described herein as including multiple components may be referred to elsewhere as a single metal part.

Several descriptive terms may be used regularly herein, as described below. The terms "first", "second", and "third" may be used interchangeably to distinguish one component from another and are not intended to signify location or importance of the individual components.

The terminology used herein is for the purpose of describing metal particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides embodiments of a method for creating a three-dimensional (3D) mark in a protective coating over a metal part. The method may include positioning a mask over the protective coating, the mask including an opening pattern therein; and performing an abrasive waterjet process on the protective coating using the mask. The abrasive waterjet at least erodes a first portion of the protective coating exposed through the first opening pattern to create the 3D mark. The 3D mark only partially penetrates through the protective coating, thus preventing damage to the coating and/or exposure of the underlying metal. The mask is removed, leaving the 3D mark in the protective coating. Embodiments of the disclosure may also include a metal part having a metal body, a protective coating over at least a portion of the metal body, and the 3D mark in the protective coating. The use of the mask and abrasive water jetting allow the 3D mark to include an opening having a width, in one embodiment, between 30 and 300 micrometers, in a preferred embodiment between 50 and 200 micrometers, and in a more preferred embodiment, between 80 and 120 micrometers. The methods allow formation of a 3D mark on a protective coating where normally marks could not be formed and/or with an opening size that is impossible with current processing. The process can be advantageously carried out in a factory setting or on-site. "On-site" may include any situation that does not include the highly controlled environment of a factory such as but not limited to: an aircraft hangar, a power plant, an oil rig, a ship, a bridge, or a metal structure of a building. Formation of the 3D mark in the protective coating allows mark applications such as strain measurements, identification, etc., to be added to metal parts that already have a protective coating thereon.

Referring to the drawings, methods for creating a three-dimensional (3D) mark in a protective coating over a metal part will now be described. FIG. 1 shows a cross-sectional view of a metal part 100 including a protective coating 102 over at least a portion of the metal part. Metal part 100 may include any now known or later developed part upon which protective coating 102 may be desired. In one non-limiting example, metal part 100 may include a turbomachine blade or nozzle, or a part thereof, that is exposed to hot combustion gases. Metal part 100 may include a metal body 104 made of any metal or metal alloy. In one non-limiting example, metal body 104 may be made of a superalloy, which may include any alloy having numerous excellent physical characteristics compared to conventional alloys, such as but not limited to: high mechanical strength, high thermal creep deformation resistance. Examples include but are not limited to: Rene 108, CM247, Haynes alloys, Incalloy, MP98T, TMS alloys, CMSX single crystal alloys, IN738, Hast X, stainless steel e.g., ST13, ST70. While shown as having a planar exterior surface 116, metal body 104 can be planar and/or curved (see e.g., FIG. 13), and may include any variety of exterior surface structure, e.g., dimples, ridges, trenches, etc.

Figure 13:
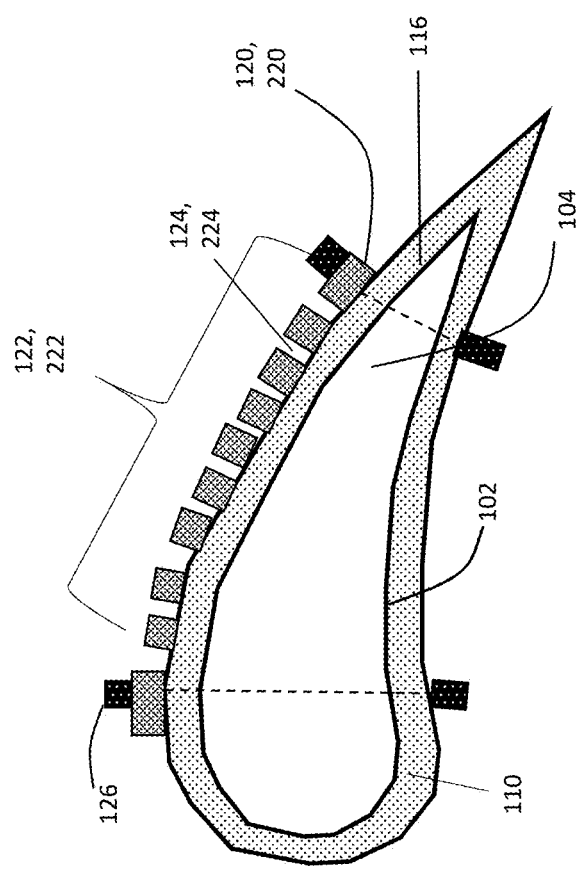
FIG. 13 shows a cross-sectional view of a curved metal part with a curved mask positioned on the protective coating.

Protective coating 102 may include a ceramic thermal barrier coating (TBC) 110 over a bond coating 112, as shown in FIG. 1, or a bond coating 112 alone (see e.g., FIG. 13). TBC 110 may include any now known or later developed ceramic TBC material such as but not limited to: yttria-stabilized zirconia (YSZ), mullite and alumina. TBC 110 may also include additional layers (not shown) such as a thermally grown oxide. TBC 110 may have a variety of porosities and/or densities. TBC 110 may be dense vertically cracked. TBC 110 may have a thickness <1.5 millimeters (mm), preferable <500 micrometers (microns) with a manufacturing tolerance preferable <250 microns. Bond coating 112 may include any now known or later developed bond coat material such as but not limited to: nickel or platinum aluminides, nickel chromium aluminum yttrium (NiCrAlY) or nickel cobalt chromium aluminum yttrium (NiCoCrAlY). Bond coating 112 may have a thickness, for example, <500 microns. Where necessary, bond coating 112 and TBC 110 may be used together. Protective coating 102 may be over all of an exterior surface 116 of metal body 104 or over just a portion of exterior surface 116. Protective coating 102 may be formed on metal body 104 using any now known or later developed manner, e.g., plasma spraying.

Figure 2:
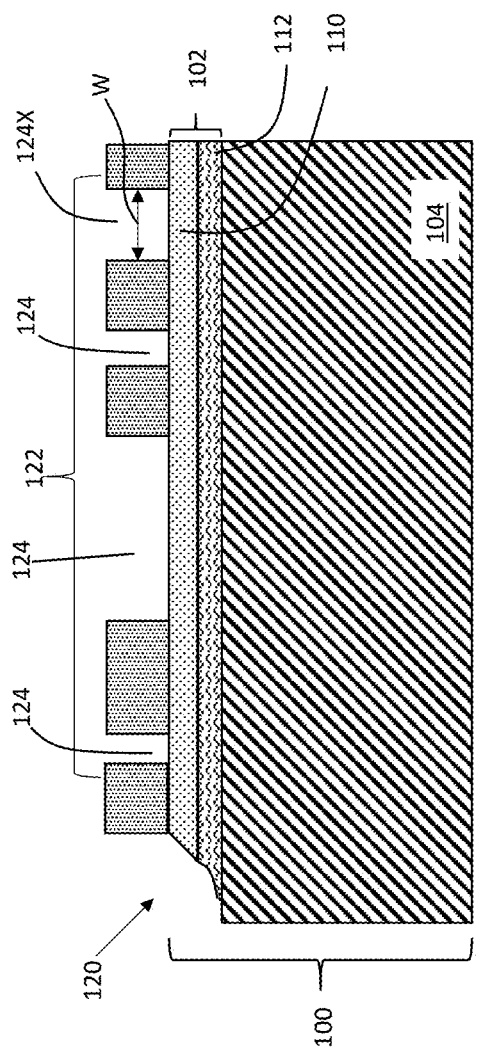
FIG. 2 shows a cross-sectional view of the metal part with a mask positioned on the protective coating.

FIG. 2 shows a cross-sectional view of positioning a mask 120 over protective coating 102. As shown in FIG. 2, mask 120 may include an opening pattern 122 therein. Opening pattern 122 may have any number of openings 124 having any shape or dimensions desired. In one embodiment, opening pattern 122 may have a smallest opening 124X having a width W between 30 and 300 micrometers, in a preferred embodiment between 50 and 200 micrometers, and in a more preferred embodiment, between 80 and 120 micrometers. Mask 120 may be made of any material capable of having opening pattern 122 formed therein, e.g., by a waterjet cutting process, EDM, etc., and capable of withstanding an abrasive waterjet process, described herein. In one embodiment, mask 120 may include, for example, a stainless steel sheet. Mask 120 may be positioned over protective coating 102 in any number of ways. For example, it can be simply laid over protective coating 102, or the process may include attaching mask 120 to protective coating 102 and/or metal body 104, e.g., by clamps (see e.g., 126 in FIG. 13), fasteners, adhesive, etc. Mask 120 may be in contact with protective coating 102 or spaced therefrom. Opening pattern 122 may be made in mask 120 material using a waterjet process; however, any now known or later developed metal cutting process capable of the desired precision may also be employed such as but not limited to: EDM, laser cutting, drilling, mechanical cutting. In the example shown, mask 120 is a positive mask, but it can also be a negative mask (see e.g., FIG. 12).

Figure 3:
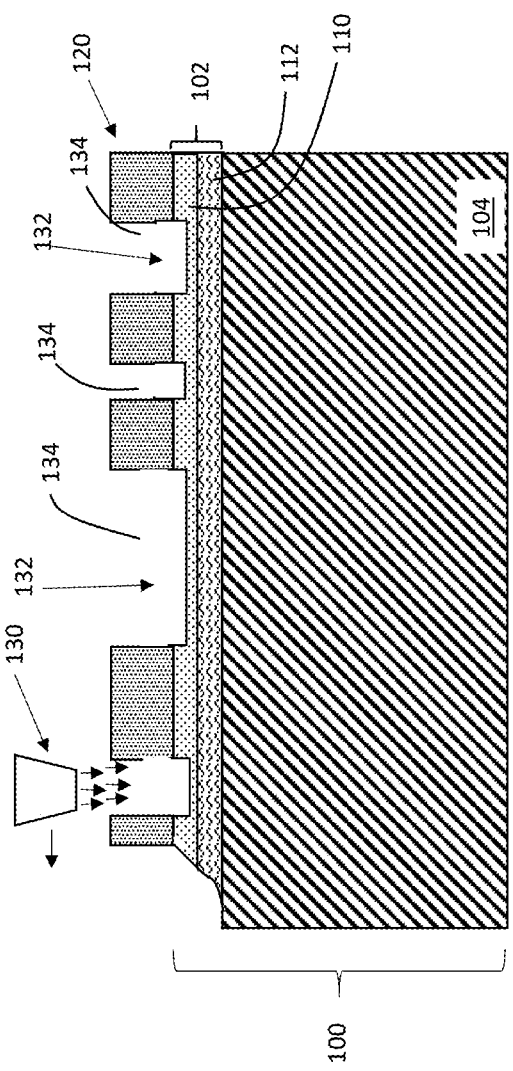
FIG. 3 shows a cross-sectional view of an abrasive waterjet process using the mask positioned on the protective coating.

FIG. 3 shows a cross-sectional view of performing an abrasive waterjet process 130 on protective coating 102 using mask 120. As shown in FIG. 3, abrasive waterjet process 130 erodes a first portion of protective coating 102, e.g., TBC 110 without damaging bond coating 112, exposed through opening pattern 122 to create a 3D mark 132. 3D mark 132 may include any number, shape and size of openings 134 commensurate with opening pattern 122 in mask 120. A second portion of protective coating 102 under mask 120 is protected by the mask and is not eroded. As shown in FIG. 3, abrasive waterjet process 130 may be controlled such that 3D mark 132 penetrates only partially through protective coating 102. The extent to which openings 134 penetrate protective coating 102 can be controlled by, for example, the waterjet pressure. The width of opening 134 (i.e., in X-Y plane) may depend on a number of factors such as but not limited to: abrasive particle size, density, velocity (based on waterjet pressure and nozzle distance from material), and/or hardness (e.g., HRB if measured on the Rockwell scale using any conventional process); hardness of the material to be opened; machining accuracy of mask 120 (e.g., 1 um for precision waterjet cutting, 5 um for laser cutting); and/or the width of the mask machining tool (e.g., drill, mill, waterjet, laser (e.g., 30 um for waterjet and laser). A depth of openings 134 (i.e., in Z direction) may be controlled based on the duration of the process. Openings 134 may extend partly through TBC 110, completely through TBC 110 to bond coating 112, or less preferably completely through TBC 110 and partly through bond coating 112. In the latter case, metal body 104 is not abraded, i.e., it remains completely preserved from the abrasion. Metal body 104 remains completely preserved from the abrasion.

In another embodiment, when there is no TBC 110, openings 134 may extend partly through bond coating 112, or completely through bond coating 112 to a surface of metal body 104. However, metal body 104 is not abraded, i.e., it remains completely preserved from the abrasion. The precision in the depth of abrasive waterjet process can be controlled to not abrade the surface—no abrasion or crack is created on metal body 104.

The abrasive waterjet process 130 can be performed using any now known or later developed abrasive waterjet system. Abrasives used can be selected for the materials being abraded and the desired duration of the process. In one embodiment, opening 134 may a width between 30 and 300 micrometers. In a preferred embodiment, opening 134 may have a width between 50 and 200 micrometers, and in a more preferred embodiment, between 80 and 120 micrometers. The width may be produced with a precision/tolerance of +/−20%, and preferably +/−10%. In one embodiment, abrasive waterjet process 130 occurs at a water pressure of between 20 bars and 150 bars. It has been discovered that this pressure range allows creation of structures such that 3D mark 132 can create openings 134 of a width described herein, even on metal parts 100 with curved surfaces and with metal parts 100 installed on other equipment.

Figure 4:
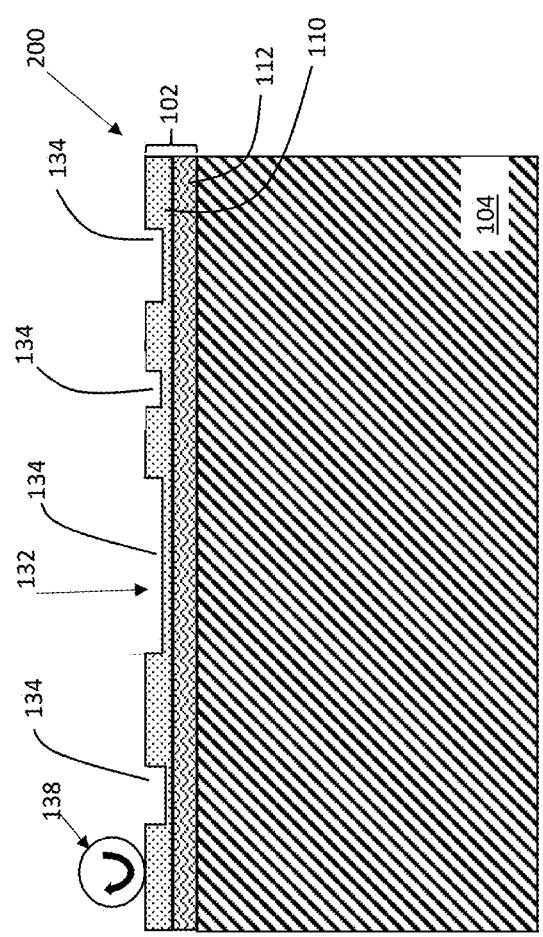
FIG. 4 shows a cross-sectional view of the metal part with an illustrative 3D mark in the protective coating according to one embodiment of the disclosure.
Figure 5:
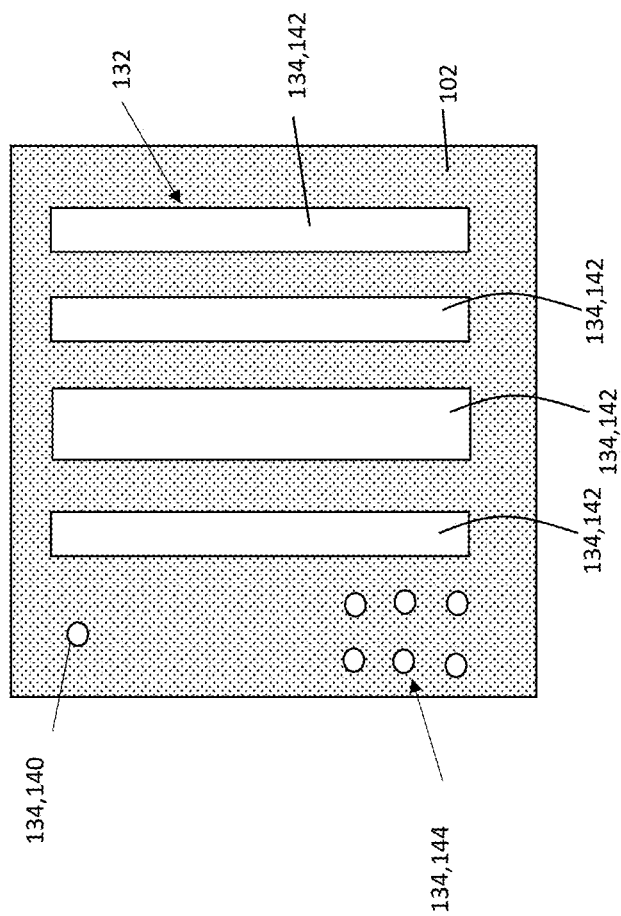
FIG. 5 shows a plan view of the metal part with the 3D mark in the protective coating according to one embodiment of the disclosure.

As shown in the cross-sectional view of FIG. 4 and the plan view of FIG. 5, after the abrasive waterjet process 130, mask 120 may be removed, leaving 3D mark 132 in protective coating 102. 3D mark 132 may include any variety of opening 134 capable of being created by an abrasive waterjet process 130 (FIG. 3) including but not limited to: holes 140 (partially through coating 102) and channels 142. Groups of holes may be closely clustered to form a dimple pattern 144. Opening 134, after removing mask 120, may have depth less than 2.0 microns, and a maximum depth at or near the thickness of protective coating 102.

In one embodiment, after removing mask 120, protective coating 102 may be optionally machined 138 to a desired depth less than a depth of protective coating 102 prior to the machining.

Figure 6:
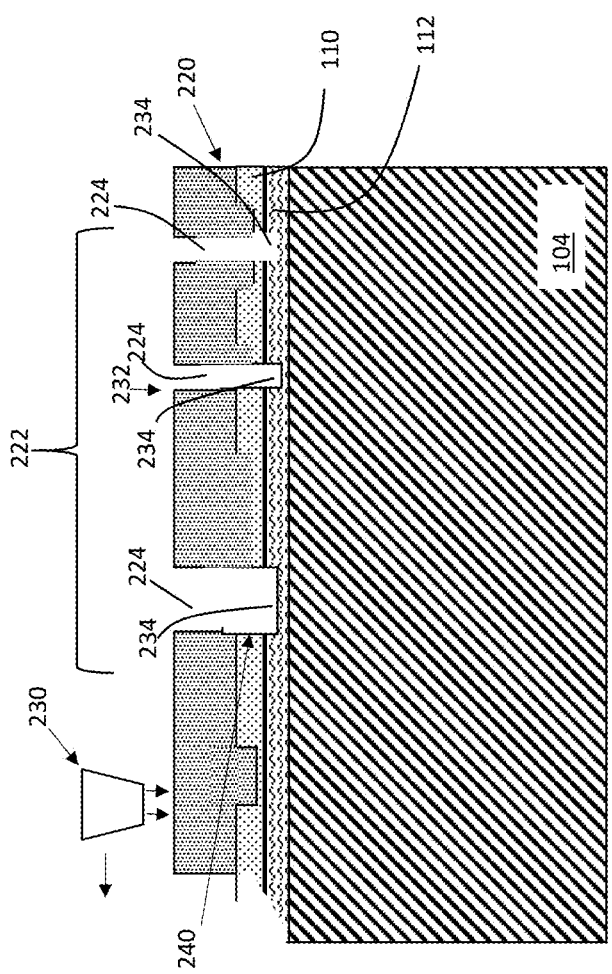
FIG. 6 shows a cross-sectional view of another abrasive waterjet process using another mask positioned on the protective coating.
Figure 7:
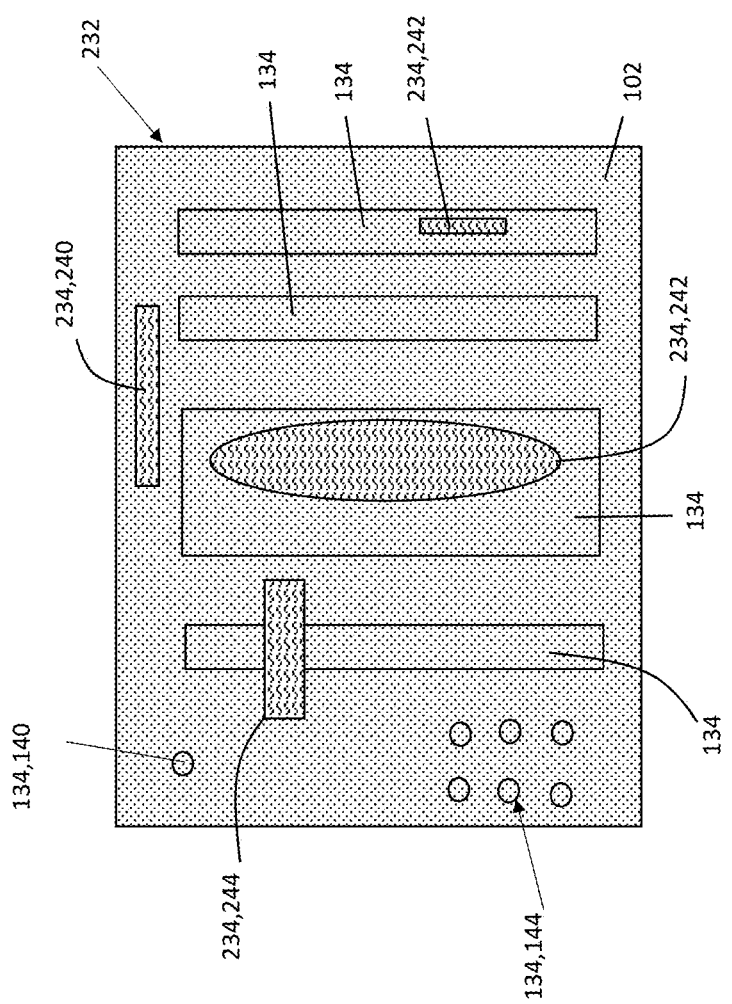
FIG. 7 shows a plan view of the metal part with a 3D mark in the protective coating as in FIG. 6.

Referring to FIGS. 6 and 7, some embodiments of the disclosure may include repeating the masking and abrasive waterjet process to create a 3D mark 232 having openings 234 not possible with just one masking and waterjet process. The process may also repeat more than twice, if desired. As shown in the cross-sectional view of FIG. 6, after removing mask 120, the process may include positioning another mask 220 over protective coating 102. Mask 220 includes another opening pattern 222 therein. Opening pattern 222 may have any number of openings 224 having any shape or dimensions desired. In one embodiment, opening pattern 222 may have a smallest opening 224X having a width W between 30 and 300 micrometers, in a preferred embodiment between 50 and 200 micrometers, and in a more preferred embodiment, between 80 and 120 micrometers. The width may be produced with a precision/tolerance of +/−20%, and preferably +/−10%. FIG. 6 also shows performing a second abrasive waterjet process 230 on protective coating 102 using mask 220. The second abrasive waterjet 230 erodes an additional amount of the first portion of protective coating 102, i.e., where openings 134 exist, and/or a second portion of protective coating 102, i.e., where openings 134 do not exist, exposed through second opening pattern 222 to create 3D mark 232 with the first eroded portion of protective coating 102. 3D mark 232 penetrates only partially through protective coating 102 after the second abrasive waterjet process 230.

Opening pattern 222 may be the same as opening pattern 222, allowing deepening of openings 134, but may be different. As observed in the cross-sectional view of FIG. 6 and the plan view of FIG. 7, FIG. 7 shows examples of how a different opening pattern 222 may create openings 234 from the second mask/waterjet process that interact with openings 134 from the first mask/waterjet process. For example, openings 234 may: be independent of openings 134 (see e.g., opening 240), add to the depth, length or width of openings 134 (see e.g., openings 242), and/or allow for creation of openings that cross paths (see e.g., crossed openings 244). FIG. 7 shows the structure after removing second mask 220, leaving 3D mark 232 in protective coating 102. Second abrasive waterjet process 230 may be the same as first abrasive waterjet process 130 (FIG. 3). In some embodiments, second abrasive waterjet process 230 may be different than first abrasive waterjet process 130 (FIG. 3). For example, second abrasive waterjet process 230 may use a different water pressure than first abrasive waterjet process 130 (FIG. 3). Second abrasive waterjet process 230 may be controlled in any manner described relative to the first abrasive waterjet process 130. Mask 220 may be made of any of the materials and may be made in any manner described herein for mask 120. Openings 234 may have any dimensions as described relative to openings 134.

Figure 8:
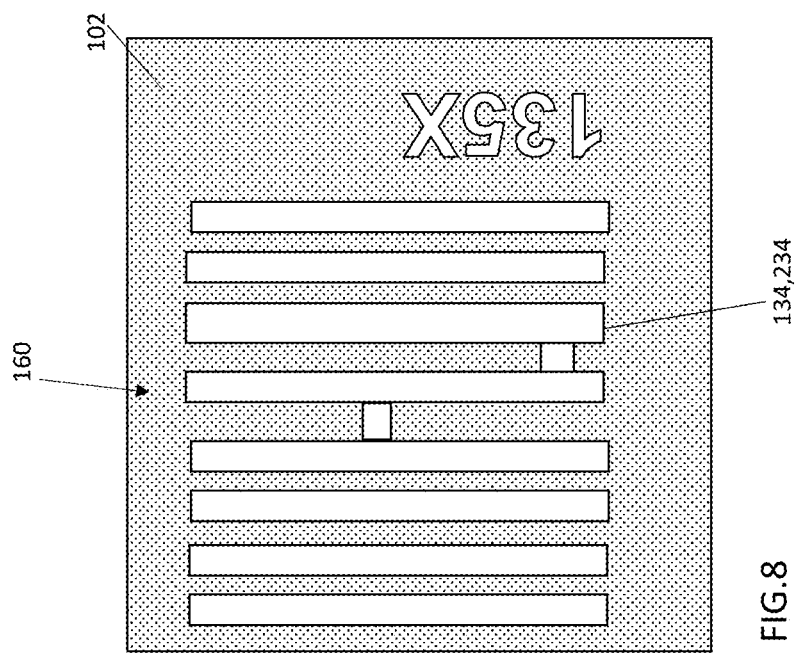
FIG. 8 shows a plan view of a metal part with an illustrative 3D mark in the protective coating.
Figure 9:
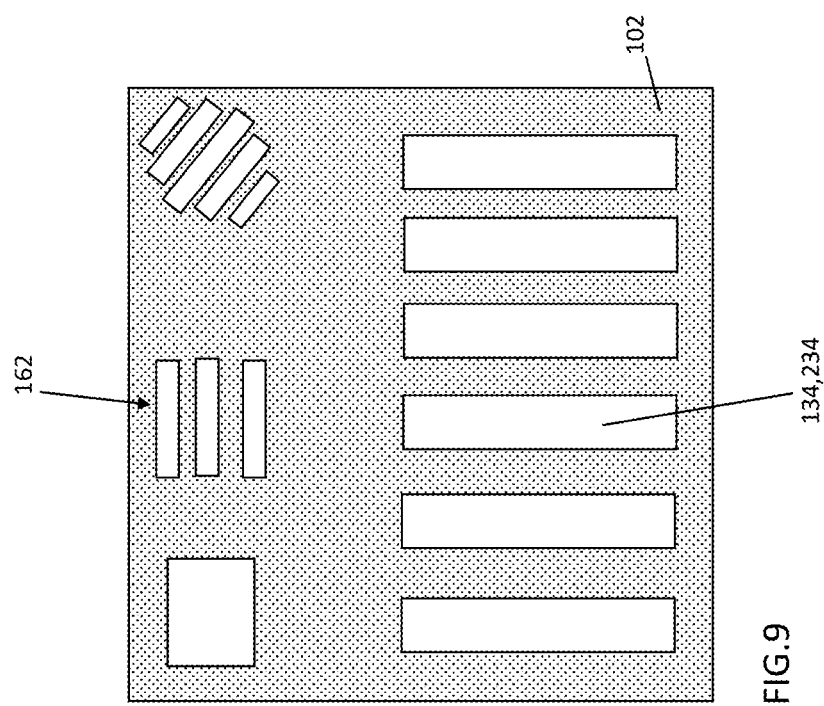
FIG. 9 shows a plan view of a metal part with another illustrative 3D mark in the protective coating.

3D mark 132, 232 can take any variety of form of mark typically applied to a metal part. FIGS. 8-12 show examples of 3D marks. It will be recognize that where a single mask/waterjet process is used for forming the 3D marks in FIGS. 8-12, the masks may have opening patterns 122 having openings 124 therein that are identical or nearly identical to the openings (134 or 234) shown. Further, where more than one mask/waterjet process is used, the masks may have openings 124, 224 that collectively create the openings (134 and 234) shown. FIG. 8 shows a 3D mark 160 in the form of an identifier for a metal part, e.g., a bar code (traditional, quick response or other form) and/or an alphanumeric identifier. As observed, the process can achieve sharp edges and/or round edges without cracks. FIG. 9 shows a mask for creating a 3D mark 162 in the form of a creep sensor in protective coating 102. In this regard, a method according to embodiments of the disclosure may include performing a creep analysis based on 3D mark 162 in the protective coating. While any now known or later developed creep sensor measurement may be employed, the creep sensor may be, for example, in any form of a creep sensor for use in a LifeSight® creep measurement system, available from General Electric Co. In any event, in contrast to conventional creep analysis, the creep sensor is in an existing protective coating 102, not in a ceramic added to the metal for the purpose of the sensor exclusively. Further, this process can be performed on-site rather than in a factory, eliminating costs for, for example, part transportation, coating removal and it can be performed on larger parts which would not be considered possible otherwise.

Figure 10:
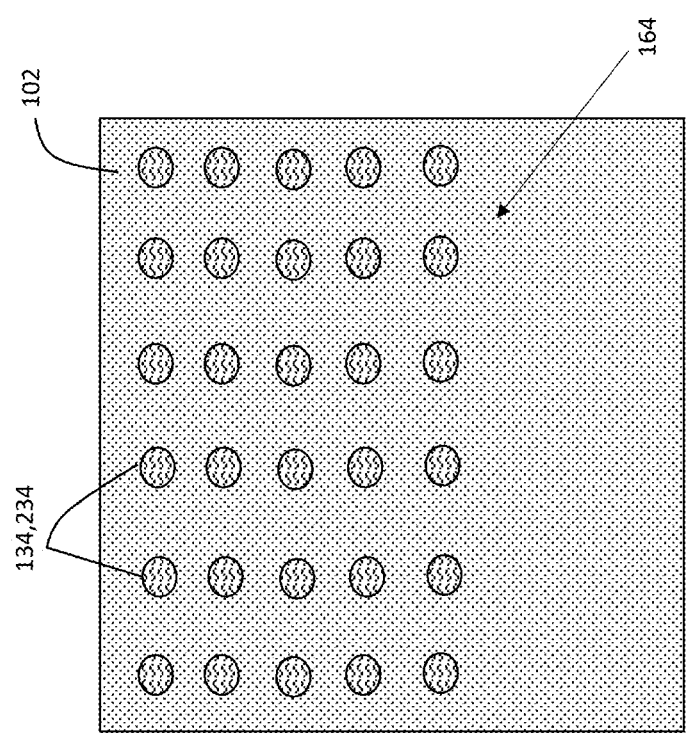
FIG. 10 shows a plan view of a metal part with yet another illustrative 3D mark in the protective coating.
Figure 11:
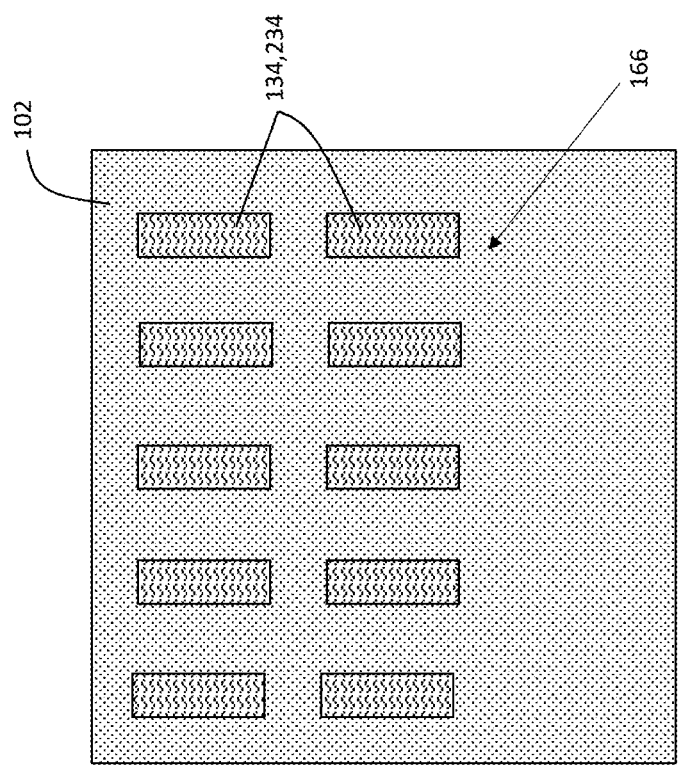
FIG. 11 shows a plan view of a metal part with an illustrative 3D mark in the protective coating.
Figure 12:
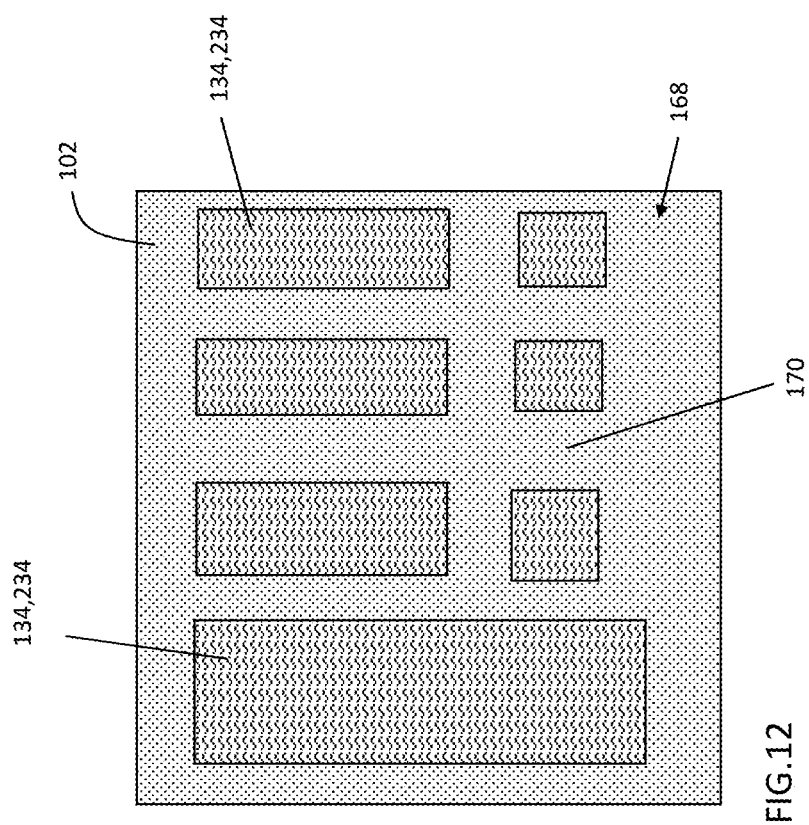
FIG. 12 shows a plan view of a metal part with another illustrative 3D mark in the protective coating.

FIG. 10 shows a 3D mark 164 with an array of openings for use, for example, as dynamic cooling openings for cooling passages in metal part 100. FIG. 11 shows a 3D mark 166 with various linear openings. FIG. 12 shows a 3D mask 168 exemplifying structure formed with a negative mask such that openings 134, 234 are the larger parts removed, leaving raised elements 170 in protective coating 102.

FIG. 13 illustrates a metal part 100 with a curved exterior surface 116 such as an airfoil for a turbomachine blade or nozzle. Protective coating 102 here includes only bond coating 112 over metal body 104. A curved mask 120, 220 is shown over protective coating 102, prior to any abrasive waterjet process. The methodology, as described herein, can be applied to the metal part of FIG. 13.

Referring again to FIG. 4, embodiments of the disclosure result in a metal part 200. Metal part 200 may include metal body 104. Metal body 104 may include any material as described herein and may constitute any form of structure upon which a protective coating 102 may be advantageous, e.g., a turbomachine airfoil. Metal body 104 may be solid or hollow and may include any variety of internal structure (not shown), e.g., cooling passages, supports, etc. While shown as having a planar exterior surface 116 (FIG. 1), metal body 104 can be planar and/or curved (see e.g., FIG. 13), and may include any variety of exterior surface structure, e.g., dimples, ridges, trenches, etc. Metal part 200 may also include protective coating 102 over at least a portion of metal body 104, as described herein. A 3D mark is in protective coating 102 and may include an opening 134, 234 having a width between 30 and 300 micrometers, in a preferred embodiment between 50 and 200 micrometers, and in a more preferred embodiment, between 80 and 120 micrometers. The width may be produced with a precision/tolerance of +/−20%, and preferably +/−10%. Protective coating 102 may include TBC 110 and bond coating 112, or just bond coating 112 alone. The 3D mark extends only partially through protective coating 102, i.e., partially through TBC 110, completely through TBC and partially through bond coating 112, or where bond coating 112 is used alone, partially through bond coating 112. The width has an influence on the performance of the 3D mark and TBC 110 and/or bond coating 112. For example, a large mark is easier to produce and to measure. However, protective coating 102 may be weakened in the region of a large 3D mark. The suggested ranges allow a production with high quality measurement while not affecting protective coating 102 (i.e., if the 3D mark is too wide, metal body 104 below the coating might overheat and the part life time may be affected). The precision/tolerance should be kept to ensure quality measurements with no or negligible influence on the protective coating performance.

Embodiments of the disclosure provide methods of forming a 3D mark in a protective coating over a metal part with high precision even though the method may not be performed in a factory setting. Accordingly, the methods can be applied on-site to a used metal part with a protective coating. The methods are not destructive of the protective coating, and will not form cracks or other damage in the coating or in the metal part. Since the 3D mark does not penetrate through the protective coating, the underlying metal body remains protected. No cracks are initiated and propagated in the protective coating or the metal body. The mask can be applied as a negative or a positive marks of the pattern desired. 3D mask allows performance of a creep analysis to metal parts having protective coatings where the analysis would normally not be possible. The methods provide cost effective production of various structures, e.g., creep sensors, bar codes, etc., in a factory or on-site, on any metal part. Currently creep sensors have high production cost and can only be created in the factory. In addition, the material currently applied for creating a creep sensor has a limited lifetime in an eroding environment. A creep sensor made in the protective coating has much longer lifespan.

The foregoing drawings show some of the processing associated according to several embodiments of this disclosure. In this regard, each drawing represents a process associated with embodiments of the method described. It should also be noted that in some alternative implementations, the acts noted in the drawings may occur out of the order noted or, for example, may in fact be executed substantially concurrently or in the reverse order, depending upon the act involved. Also, one of ordinary skill in the art will recognize that additional steps that describe the processing may be added.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for creating a plurality of three-dimensional (3D) marks in a protective coating over a metal part, the method comprising:
    positioning a first mask over the protective coating, the first mask including a first opening pattern therein;
    clamping the first mask to the protective coating and the metal part;
    performing a first abrasive waterjet process on the protective coating using the first mask, the first abrasive waterjet process eroding a first portion of the protective coating exposed through the first opening pattern to create the plurality of 3D marks, the plurality of 3D marks penetrating only partially through the protective coating; wherein the plurality of 3D marks is configured for determining creep in the metal part, where each of the plurality of 3D marks is separated from each other and each of the plurality of 3D marks is configured to undergo individual and independent creep;
    removing the first mask, leaving the plurality of 3D marks in the protective coating; and
    after removing the first mask, milling the protective coating previously covered by the first mask to a desired depth less than a depth of the protective coating prior to the milling.

2. The method of claim 1, wherein the protective coating is one of a ceramic thermal barrier coating (TBC) and a bond coating, and a bond coating alone, over at least a portion of the metal part.

3. The method of claim 1, wherein the first abrasive waterjet process performing creates the plurality of 3D marks in the form of a creep sensor in the protective coating.

4. The method of claim 3, further comprising performing a creep analysis based on the plurality of 3D marks in the protective coating.

5. The method of claim 1, wherein the first abrasive waterjet process performing creates the plurality of 3D marks in the form of an identifier for the metal part.

6. The method of claim 1, further comprising after removing the first mask:
    positioning a second mask over the protective coating, the second mask including a second opening pattern therein;
    performing a second abrasive waterjet process on the protective coating using the second mask, the second abrasive waterjet process eroding at least one of an additional amount of the first portion of the protective coating and a second portion of the protective coating exposed through the second opening pattern to create the plurality of 3D marks with the first portion of the protective coating, the plurality of 3D marks penetrating only partially through the protective coating after the second abrasive waterjet process; and
    removing the second mask, leaving the plurality of 3D marks in the protective coating.

7. The method of claim 6, wherein the first abrasive waterjet process and the second abrasive waterjet process use a different water pressure.

8. The method of claim 6, wherein at least one of the first mask or the second mask include a stainless steel sheet.

9. The method of claim 8, further comprising forming at least one of the first opening pattern and the second opening pattern in a respective mask using a waterjet process.

10. The method of claim 6, wherein at least one of the first portion and the second portion has an opening having a width between 30 and 300 micrometers.

11. The method of claim 10, wherein the at least one of the first portion and the second portion has the opening having the width between 80 and 120 micrometers.

12. The method of claim 1, wherein the plurality of 3D marks includes at least one of: holes and channels.

13. The method of claim 1, wherein the first abrasive waterjet process occurs at a water pressure of between 20 bars and 150 bars.

* * * * *